(12) United States Patent
Angello et al.

(10) Patent No.: US 9,752,960 B2
(45) Date of Patent: Sep. 5, 2017

(54) SYSTEM AND METHOD FOR ANOMALY DETECTION

(75) Inventors: Leonard Angello, Mountain View, CA (US); Tim Lieuwen, Atlanta, GA (US); David Robert Noble, Marietta, GA (US); Brian Poole, State College, PA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 651 days.

(21) Appl. No.: 14/359,539

(22) PCT Filed: Nov. 22, 2011

(86) PCT No.: PCT/US2011/061879
§ 371 (c)(1),
(2), (4) Date: Oct. 9, 2014

(87) PCT Pub. No.: WO2013/077861
PCT Pub. Date: May 30, 2013

(65) Prior Publication Data
US 2015/0051847 A1 Feb. 19, 2015

(51) Int. Cl.
*G01B 3/00* (2006.01)
*G01B 5/28* (2006.01)
(Continued)

(52) U.S. Cl.
CPC .......... *G01M 15/14* (2013.01); *F01D 21/003* (2013.01); *F23N 5/242* (2013.01);
(Continued)

(58) Field of Classification Search
CPC ......... F05D 2270/708; F05D 2270/334; F05D 2270/304; F05D 2260/80; F01D 21/003;
(Continued)

(56) References Cited

U.S. PATENT DOCUMENTS 3,946,364 A 3/1976 Codomo et al.
4,058,975 A 11/1977 Gilbert et al.
(Continued)

FOREIGN PATENT DOCUMENTS

EP 1 632 718 A2 3/2006

OTHER PUBLICATIONS

EP 11876073.5—European Search Report, May 29, 2015.
(Continued)

*Primary Examiner* — An Do
(74) *Attorney, Agent, or Firm* — Curatolo Sidoti Co., LPA; Vincent A. Cortese; Peter J. Beardsley

(57) ABSTRACT

A system and method for anomaly detection is provided. The system (100) and method (200) include utilizing one or more processors, such as in a server, for receiving (108) operational and dynamics data (104) from sensors associated with devices (102), filtering the data, establishing a set of baseline dynamics data and eliminating data dependencies (110). The system and method further include generating an expected level of data variation (112), identifying an anomaly based on a deviation of the device data from the baseline data normalized by the expected level of data variation (114), optionally correlating an anomaly with potential causes, and providing an output indicating an anomaly (116).

17 Claims, 13 Drawing Sheets

(51) Int. Cl.
*F02C 1/00* (2006.01)
*F02C 9/00* (2006.01)
*G01M 15/14* (2006.01)
*F01D 21/00* (2006.01)
*F23N 5/24* (2006.01)

(52) U.S. Cl.
CPC .... *F05D 2260/80* (2013.01); *F05D 2270/304* (2013.01); *F05D 2270/334* (2013.01); *F05D 2270/708* (2013.01); *F23N 2041/20* (2013.01); *F23R 2900/00013* (2013.01)

(58) Field of Classification Search
CPC ............... F23N 2041/20; F23N 5/242; F23R 2900/00013
USPC ............................. 702/33, 35; 60/772, 773
See application file for complete search history.

(56) References Cited

U.S. PATENT DOCUMENTS

| | | | |
|---|---|---|---|
| 5,024,055 A | 6/1991 | Sato et al. | |
| 6,789,390 B2 | 9/2004 | Hu et al. | |
| 6,983,603 B2 | 1/2006 | Macchia | |
| 7,322,794 B2 | 1/2008 | LeMieux et al. | |
| 7,369,932 B2 | 5/2008 | Kim et al. | |
| 7,369,965 B2 | 5/2008 | Mylaraswamy et al. | |
| 7,395,188 B1 | 7/2008 | Goebel et al. | |
| 7,715,991 B2 | 5/2010 | Potdar et al. | |
| 7,725,293 B2 | 5/2010 | Bonissone et al. | |
| 7,734,400 B2 | 6/2010 | Gayme et al. | |
| 7,933,754 B2 | 4/2011 | Goebel et al. | |
| 2005/0021212 A1 | 1/2005 | Gayme et al. | |
| 2006/0042261 A1 | 3/2006 | Taware et al. | |
| 2007/0214796 A1 | 9/2007 | Bland et al. | |
| 2007/0239633 A1 | 10/2007 | Dietrich et al. | |
| 2007/0260390 A1 | 11/2007 | Kim et al. | |
| 2008/0010966 A1 | 1/2008 | Taware et al. | |
| 2010/0076698 A1 | 3/2010 | He et al. | |
| 2011/0040469 A1 | 2/2011 | Singh et al. | |

OTHER PUBLICATIONS

PCT/US2011/061879—International Search Report, mailed on Aug. 3, 2012.
PCT/US2011/061879—International Written Opinion, mailed on Aug. 3, 2012.
PCT/US2011/061879—International Preliminary Report on Patentability, May 27, 2014.
Stambler, Irwin "Early warning detection to prevent combustor failures", Gas Turbine World, pp. 20-25, Jul.-Aug. 2009.
Stambler, Irwin "Diagnostic health monitoring will reduce new technology O&M risk", Gas Turbine World, pp. 28-31, Jan.-Feb. 2006.
Ratliff, Phil, et al. "The New Siemens Gas Turbine SGT5-8000H for More Customer Benefit", VGB PowerTech, pp. 128-132, Sep. 2007.
Kim, Kyusung "Fault diagnosis and prognosis for fuel supply systems in gas turbine engines", Journal of Mechanical Engineering Science, pp. 757-768, Proc.IMechE, vol. 223, Part C, Mar. 1, 2009.

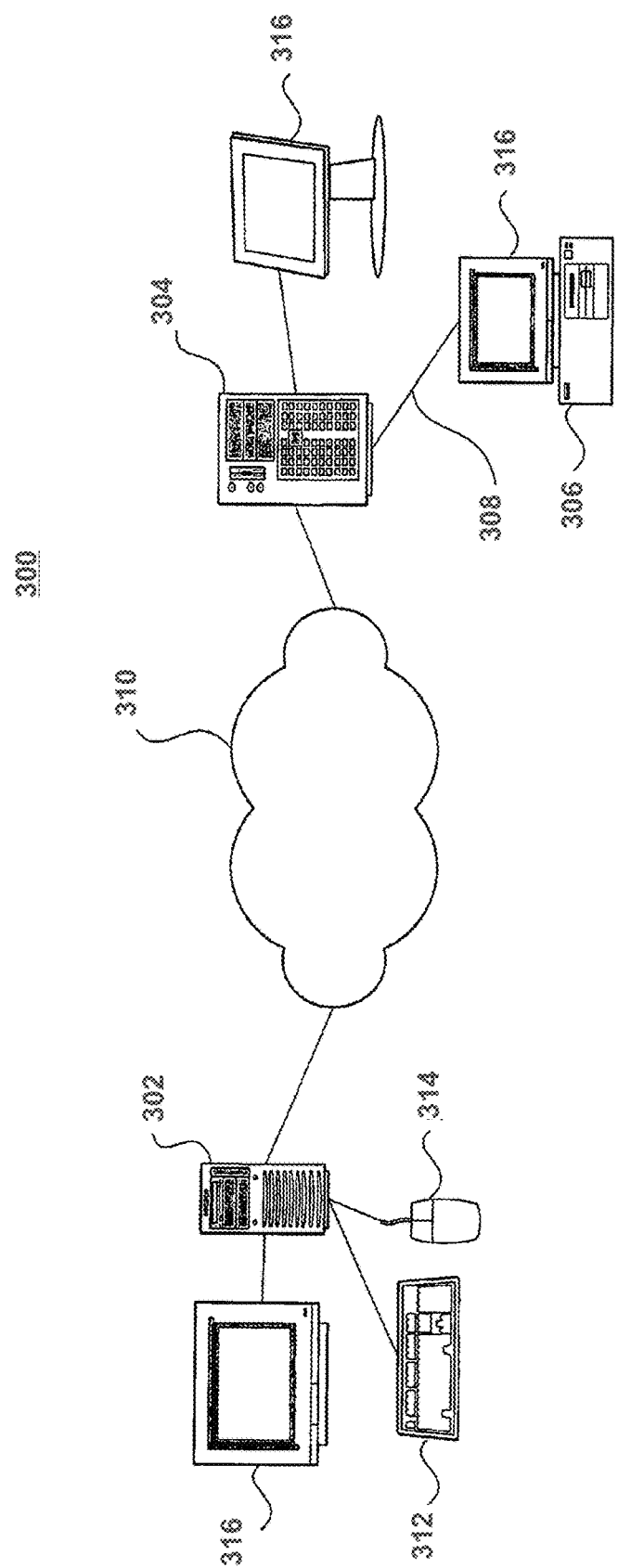

SYSTEM AND METHOD FOR ANOMALY DETECTION

CROSS REFERENCE TO RELATED APPLICATIONS

This application is a national stage application of International Application No. PCT/US2011/061879, filed 22 Nov. 2011, which is incorporated herein by reference.

Gas turbines have become a key technology for new power generating capacity in the United States and worldwide due to higher operating efficiencies and fewer pollutant emissions when compared to traditional power generation systems. Tightened emissions targets and the need for improved fuel efficiency and reliability have increased the level of technology in today's gas turbine engines. Performance and reliability are critical requirements of these highly complex mechanical systems.

Gas turbine engine emissions may be reduced by utilizing very lean fuel-air mixtures, however, this causes increased combustion instability in the gas turbine. Increased combustion instability can damage components in the turbine's combustion chamber causing degradation or even catastrophic failure of combustion components or components downstream of the combustion chamber. Unfortunately, detrimental combustion instabilities often occur within the combustor when it operates under lean conditions, degrading engine performance and reducing combustor life.

Combustion dynamics are pressure waves of defined amplitudes and frequencies that are associated with the natural acoustic modes of the combustion system. For example, in the typical can-annular combustor of a large gas turbine, combustion dynamics may range in frequency from less than 50 Hz to several 1000 Hz. In terms of their impact on turbine components, dynamics of these frequencies can range from benign to highly destructive. Combustion instabilities in industrial gas turbines can produce intolerably large pressure waves, which lead to fatigue, detachment of components, costly outages and repair.

Gas turbine users have found that components such as combustor liners, transition pieces and fuel nozzles require scheduled examination for part cracking or excessive wearing because of vibration induced fretting and fatigue. At a minimum, this requires downtime for inspections and part repair, reducing machine availability. At the worst, a cracked piece may be liberated into the hot gas path, potentially requiring replacement of expensive turbine components. In addition, users in certain geographic areas have found that engines must be seasonally re-tuned to eliminate oscillations due to ambient temperatures.

In order to minimize the possibility of very large amplitude, damaging oscillations in gas turbines, combustion dynamics monitoring systems are routinely deployed. Combustion dynamics monitoring systems are designed to alert the operator if the dynamics exceed certain thresholds.

The avoidance of mechanical repair costs and downtime costs may produce savings measured in millions of dollars. What is needed are improved anomaly detection systems and methods for diagnosing current problems, predicting impending failures in critical components and mitigation of detrimental effects on, for example, a gas turbine engine and its operation.

FIG. 3A is a schematic depiction of an illustrative computer network in accordance with embodiments of the disclosed system and method.

Figure 1A:
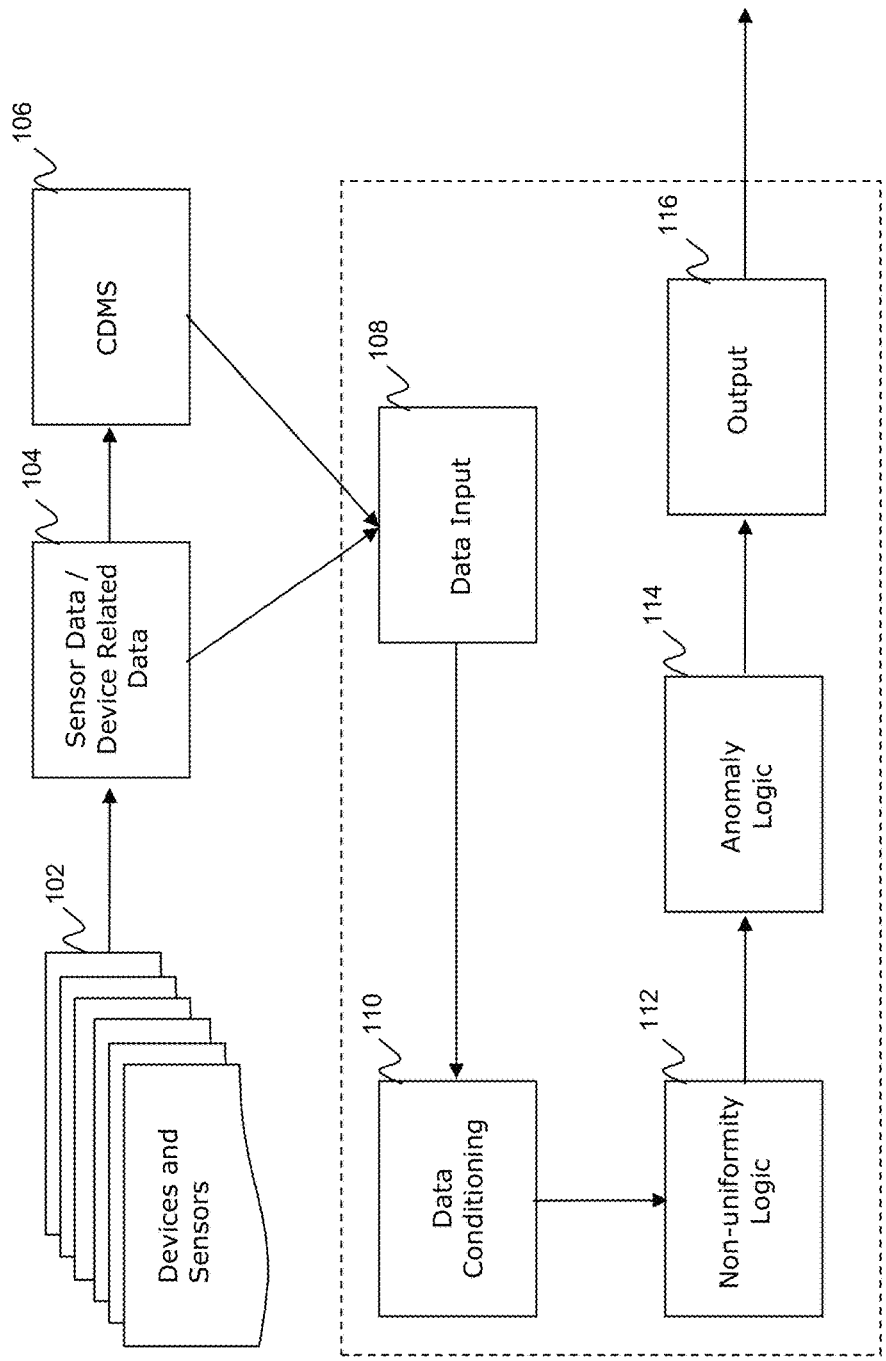
FIG. 1A is a block diagram of an illustrative anomaly detection method.

Provided is a system and method for anomaly detection. According to certain illustrative embodiments, the computer implemented method for anomaly detection comprises utilizing one or more processors and associated memory storing one or more programs for execution by the one or more processors, the one or more programs including instructions for (a) receiving operational and dynamics data from a plurality of sensors associated with a plurality of devices, (b) filtering the data, (c) establishing a set of baseline dynamics data including calculating a reference mean for each dynamic based on identifying historical data values (i) relating to a sliding time window or (ii) corresponding to a database query, said query comprising establishing reference data requirements and tolerances, identifying previous points in time that satisfy said requirements and tolerances and averaging the value of dynamics data related to said identified points in time, (d) eliminating data dependencies, (e) generating an expected level of data variation, (f) identifying an anomaly based on a deviation of the device data from the baseline data normalized by the expected level of data variation, (g) optionally correlating the anomaly with potential causes, and (h) providing an output indicating an anomaly.

According to other illustrative embodiments, an anomaly detection system for detecting anomalies in a turbine engine comprises (a) an input data module configured to receive sensor data from the turbine engine, (b) a processing module adapted to (i) establish a set of baseline dynamics data including calculating a reference mean for each dynamic based on identifying historical data values 1) relating to a sliding time window, or 2) corresponding to a database query capable of establishing reference data requirements and tolerances, identifying previous points in time that satisfy said requirements and tolerances and averaging the value of dynamics data related to said identified points in time, (ii) eliminate data dependencies, (iii) generate an expected level of data variation; and (iv) identify an anomaly based on a deviation of the sensor data from the baseline data normalized by the expected level of data variation, (c) a database capable of storing sensor data and communicating with the processing module, (d) an output data module capable of reporting results identified by the processing module, (e) an interface module capable of communicating results reported by the output data module, (f) a processor capable of managing operation of the data input module, processing module, database, output data module and/or interface module and (g) memory capable of storing instructions and data for execution by the system.

According to a further illustrative embodiment, there is provided a computer-readable storage medium on which is encoded executable program code for performing a method which comprises: (a) receiving operational and dynamics data from a plurality of sensors associated with a plurality of devices, (b) filtering the data, (c) establishing a set of baseline dynamics data including calculating a reference mean for each dynamic based on identifying historical data values (i) relating to a sliding time window or (ii) corresponding to a database query capable of establishing reference data requirements and tolerances, identifying previous points in time that satisfy said requirements and tolerances and averaging the value of dynamics data related to said identified points in time, (d) eliminating data dependencies, (e) generating an expected level of data variation, (f) identifying an anomaly based on a deviation of the device data from the baseline data normalized by the expected level of data variation, (g) optionally correlating the anomaly with potential causes, and (h) providing an output indicating an anomaly.

As used in this application, the terms "module" and "system" are intended to refer to a computer-related entity, either hardware, a combination of hardware and software, software, or software in execution. A module may, in certain embodiments, include steps or processes performed manually. For example, a module may be, but is not limited to being, a process running on a processor, a processor, an object, an executable, a thread of execution, a program or a computer. By way of illustration, both an application running on a server and the server can be a module. One or more modules may reside within a process and/or thread of execution and a module may be localized on one computer and/or distributed between two or more computers.

In an embodiment, the anomaly detection method identifies shifts in the "baseline acoustic signature" of a gas turbine engine. The amplitude and frequency of combustion pressure oscillations in a gas turbine engine are known as dynamics observables. The dynamics observables associated with a particular gas turbine engine combustion chamber are dependent on the chamber's health as well as a significant number of other factors. For example, engine power level, ambient temperature, fuel composition, inlet guide vane angle, machine-on time, and a host of other parameters may have an impact on the dynamics observables. The challenge is to identify anomalies without also sending out false alarms when something else varies, such as ambient temperature.

Figure 4:
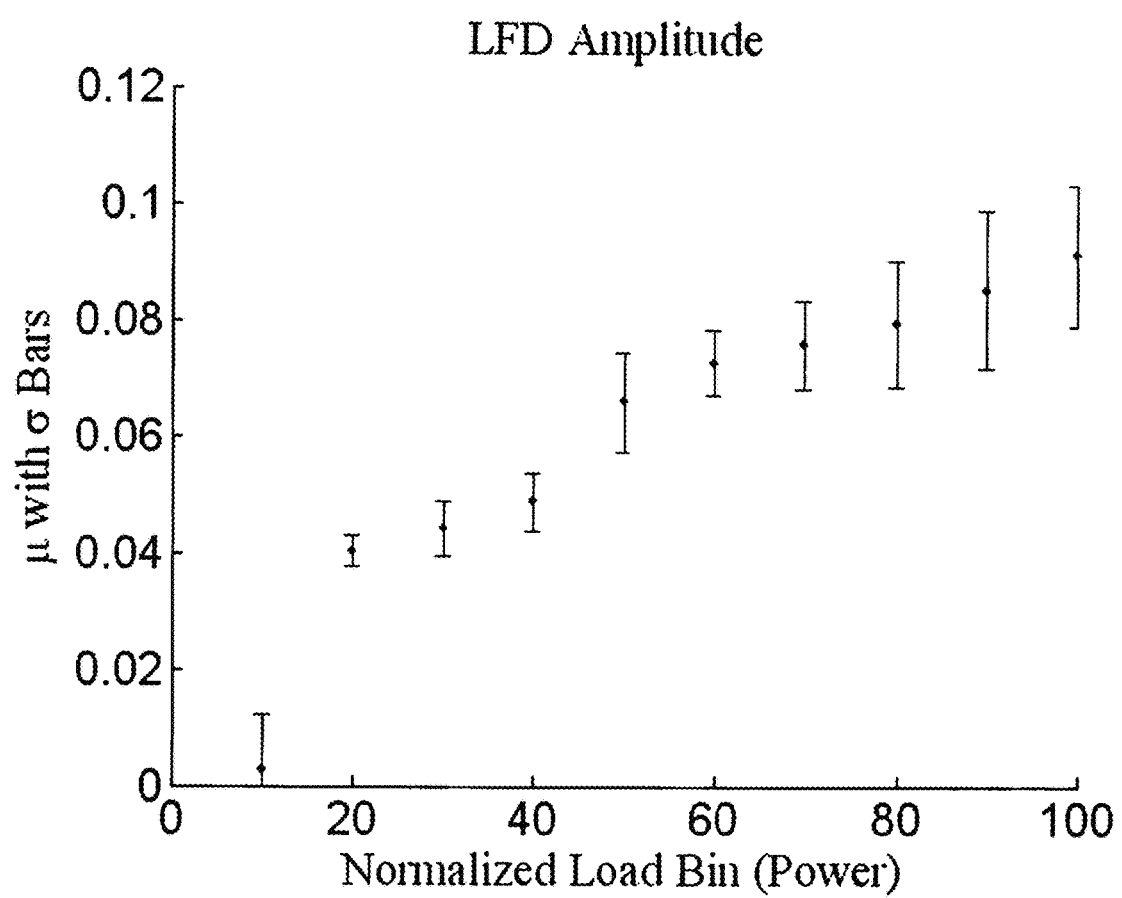
FIG. 4 is a chart illustrating the dependency of the dynamics observable, Low Frequency Dynamics amplitude, on engine power.

As an example, FIG. 4 demonstrates the dependency of a dynamics observable, "Low Frequency Dynamics" amplitude, upon engine power taken over a range of conditions. The chart illustrates the interrelation of dynamics and engine power averaged over sixteen (16) combustion chambers (or "cans") in a single gas turbine engine. The error bars denote the standard deviation of the Low Frequency Dynamics amplitude across the sixteen combustor cans.

Thus, a gas turbine engine's baseline acoustic signature, as measured by the dynamics observables, varies over the day, due to load changes, over the year, due to ambient temperature changes, and over component part life, as the engine wears and degrades. The present anomaly detection method solves the problem of filtering through inherent variations due to these factors, to identify those variations indicative of adverse behavior.

In accordance with an embodiment, the sensitivities discussed above may be eliminated by comparing a device to other devices operating under the same conditions rather than comparing a particular device to its own historical performance. For example, in a gas turbine engine, the dynamics observables of each combustion chamber may be compared to the dynamics observables of the engine's other combustion chambers. If the data from all devices is shifting in a similar direction, this may indicate the influence of a common variable, for example, machine-on time or ambient temperature. An advantage of this approach is the elimination of many of the factors noted above.

A problem occurring in a particular device may be isolated to that device, as well as neighboring devices to a lesser extent. In other words, a problem occurring in a particular device would not be expected to cause a shift in data associated with all other devices. For example, a flame flashback event occurring in a particular combustion chamber may be evidenced by a sudden shift in the chamber's dynamics observable data in the Low Frequency Dynamics range, however, this shift may not be manifested in the data related to the other combustion chambers.

An inherent complexity of this approach is that the baseline data of each device, such as individual combustion chambers, may be dissimilar to that of the others. For example, the baseline acoustic signature of a group of combustion chambers may be dissimilar due to small variations in geometric dimensions such as orifice sizes. Further-more, these device-to-device differences may manifest themselves in differences in how the various chambers respond to changes in other variables, such as inlet guide vane angle or machine-on time.

Therefore, in accordance with further embodiments, device-to-device differences and sensitivities may be taken into account by measuring how the observables for each device are changing relative to how the observables of other devices are changing.

In other embodiments, the device data may be normalized to gauge a level of deviation. Dimensional results, for example, amplitude or frequency, may be translated into a magnitude of deviation that may be compared across different dynamics observables, time intervals and locations. This data normalization allows the method to apply generically.

Provided is a robust system and method for detecting anomalous behavior in a device that is not overly sensitive to high noise levels, for example, noise present in frequency dynamics.

As shown in FIG. 1A, an anomaly detection method 100 receives as data input 108 sensor data and device related data 104 associated with a plurality of devices and sensors 102. In an embodiment, the sensor data 104 may comprise dynamics observable data and operational data. The sensors that are useful in the present system and method are those known in the art which are capable of providing a signal representative of a dynamic observable associated with the operation of a device. With respect to gas turbine engines, conventional sensors which report a signal to a combustion dynamics monitoring system (CDMS) program may be used. The method 100 may receive the sensor data 104 from, for example, a CDMS 106. The method may receive sensor data 104 directly from sensors associated with the devices 102. The input data may be subjected to conditioning 110. Data conditioning 110 may comprise, for example, data smoothing and elimination of bad data.

The non-uniformity of a device relative to the others may be measured so that device behavior may be compared across devices rather than, or in addition to, across time via non-uniformity logic 112. A reference mean for each dynamics observable may be calculated. Each dynamics observable for each device may be baselined and a reference level of expected data variation may be determined.

An anomaly may be identified via anomaly logic 114 by comparing the deviation of each device from the average behavior (baseline data) normalized by an expected level of variation.

An identified anomaly may be represented by a quantitative health indicator or non-uniformity parameter. In an embodiment, a value may be generated and presented to the user as an output 116. An identified anomaly may optionally be correlated with a potential cause of the non-uniformity.

Figure 1B:
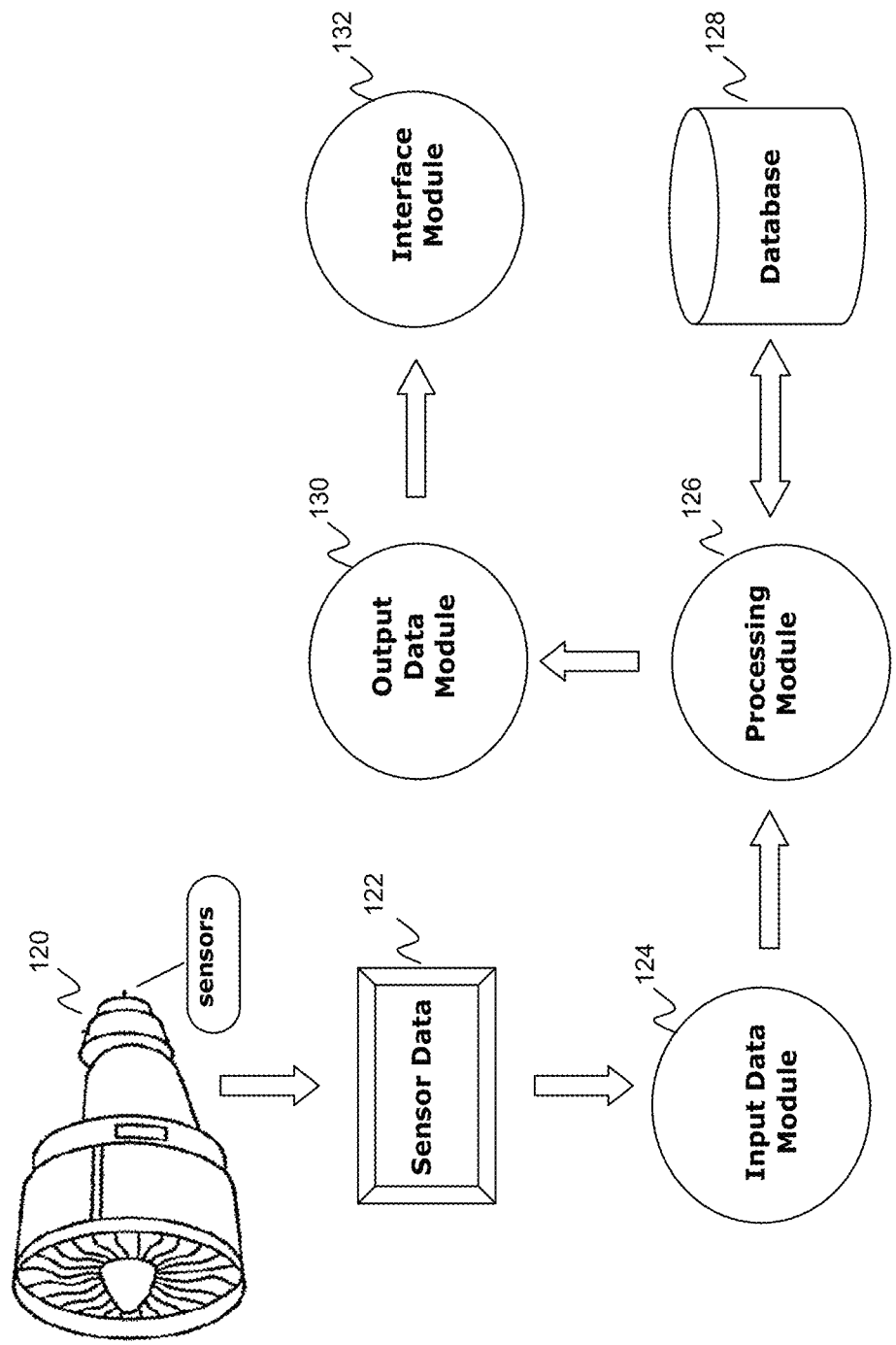
FIG. 1B is a block diagram of an illustrative anomaly detection system.

FIG. 1B illustrates an anomaly detection system for detecting anomalies in a turbine engine. The system includes at least one turbine engine and associated sensors 120 which provide sensor data 122, an input data module 124, a processing module 126, a database 128, an output data module 130 and an interface module 132.

In an embodiment, the sensors 120 are configured to generate sensor data 122 representative of the operating condition of the engine 120. Sensor data may include, for example, dynamics observables data and operational data related to the turbine engine 120. The input data module 124 may receive sensor data 122 directly from the sensors. In other embodiments, sensor data may be received by the input data module 124 from another program or system, for example, a Combustion Dynamics Monitoring System or other data acquisition system.

In an embodiment, the input data module 124 makes dynamics observables data and operational data 122 related to the turbine engine 120 available to the processing module 126. The processing module 126 is capable of identifying an anomaly based on a deviation of the sensor data 122 from established baseline data normalized by an expected level of data variation. In an embodiment, the database 128 is configured to store and make available to the processing module 126 data relating to the operating conditions of the engine 110, including the signals generated by the sensors. In further embodiments, database 128 is configured to store and make available to the processing module 126, historical sensor data associated with the turbine engine and sensors 120.

While an embodiment of the system has been described as having at least one turbine engine, it will be appreciated that the scope of the disclosure is not so limited, and that the disclosure will also apply to anomaly detection systems including other types of devices and equipment.

The output module 130 may report results identified by the processing module 126 to the interface module 132 for presentation to or notification of the user. The output module 130 may report results to the interface module 132 in raw form or may be configured to perform additional processing of the results identified by the processing module 126.

The interface module 132 may communicate the results reported by the output data module 130. Results may be communicated to a user via a display or printout or may be utilized for control purposes. In an embodiment, results may be made available in real-time, for real-time monitoring or control, or may be stored and made available for later use. In an aspect of the present disclosure, the output data module 130 may communicate results in the form of an alarm, an audible indicator, email, text message, instant message, social media message (e.g. tweet, Facebook message post), pager notification, or may utilize other communication methods. In other embodiments, the output data module 130 may forward results to another program or system, for example, a Combustion Dynamics Monitoring System, for further processing or for control purposes. In certain embodiments, the output data module 130 and interface module 132 may be integrated.

Figure 2A:
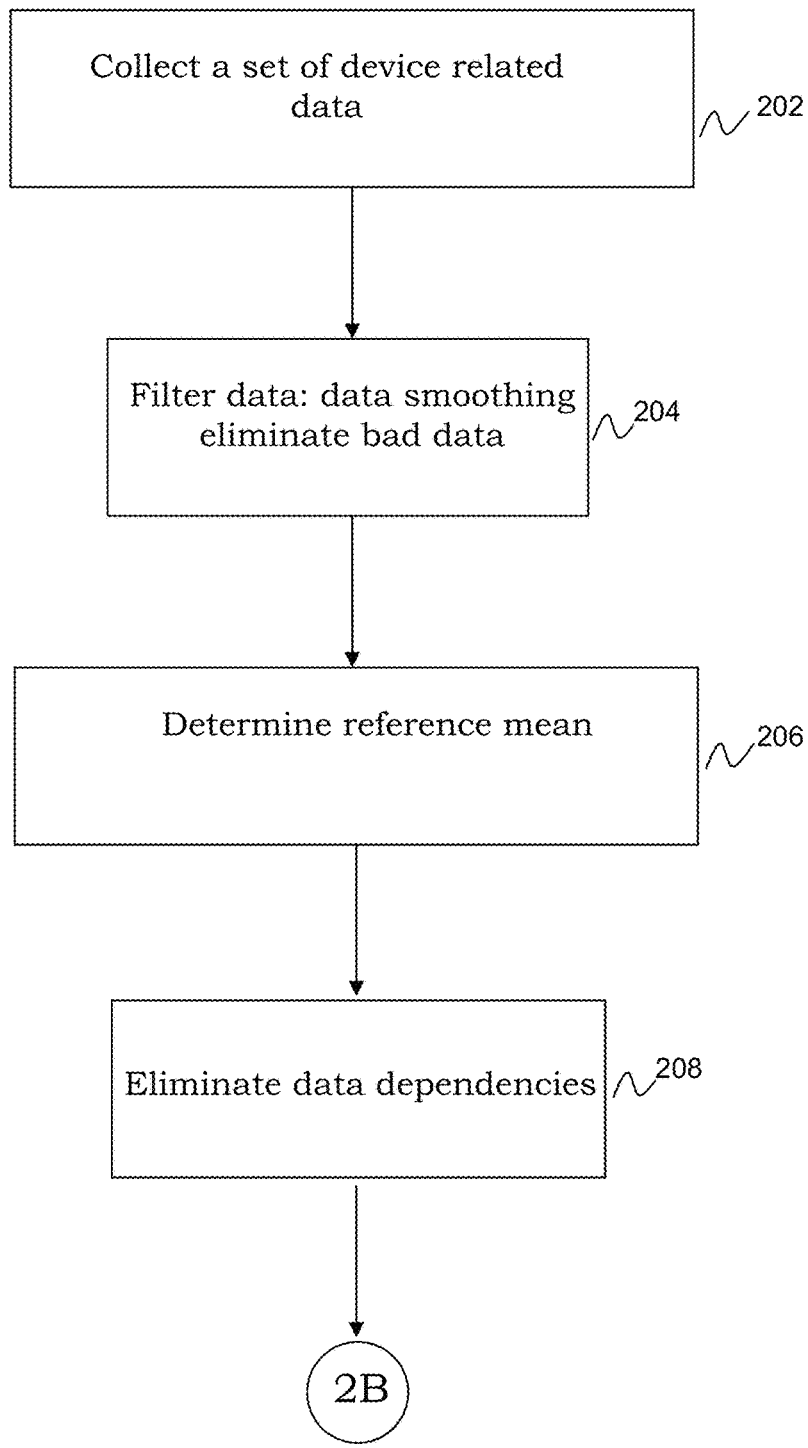
FIG. 2A is a flow diagram in accordance with an illustrative embodiment of the disclosed system and method.

Turning to FIG. 2A, the method 200 may receive as input 202 device related data, for example operational and dynamics data from sensors associated with devices. In certain embodiments, combustion dynamics monitoring systems collect dynamics data in the time domain. Time domain data may comprise pressure oscillations, electromagnetic radiation from the flame (e.g., chemiluminescence or thermal radiation), velocity oscillations, or some other observable related to combustion dynamics. Operational data may also be collected, for example, engine power, inlet guide vane angles, ambient temperature and other operational data. The device related data may be acquired from, without limitation, combustion dynamics monitoring systems, other device data collection systems or directly from sensors associated with the devices.

Large time domain dynamics data sets may be distilled into a more manageable form by extracting a peak frequency or amplitude in a given spectral range. For example, the collected data may be Fourier transformed to condense the data and encapsulate the key dynamics of a combustion chamber. Condensed frequency and amplitude data is useful since combustion dynamics are prominently manifested in relatively narrow band oscillations at frequencies associated with the natural acoustic modes of the combustion chamber. The amplitude and frequency of pressure oscillation spectral bins may be extracted over a time period and a backward running average may be calculated. In an embodiment, the time period may comprise one to sixty seconds. Alternative approaches for distilling the data could also be used, such as wavelets.

The extracted amplitudes and frequencies may be associated with a particular spectral bin. For example, implementations in some gas turbine engines generate four spectral bins over the ranges with the nomenclature shown below. For illustrative purposes, four spectral bins are shown, however, the present method may be applied to an arbitrary number of bins.

0-50 Hz: Low Frequency Dynamics (LFD)
50-100 Hz: Intermediate Frequency Dynamics, 1 (IFD1)
100-500 Hz: Intermediate Frequency Dynamics, 2 (IFD2)
>500 Hz: High Frequency Data (HFD)

The collected data may be filtered 204 to reduce inherent variations. Data filtering 204 may comprise for example, data smoothing and eliminating bad data. Data smoothing may reduce the majority of fluctuations induced by background noise. In an embodiment, data smoothing may comprise additional averaging of the extracted frequency and amplitude data. A variety of methods of data smoothing may be employed, for example, calculating a backward looking running average. Longer averaging times may yield smoother data but also suppress potentially significant time-localized variations. In accordance with an embodiment, an averaging time may comprise ten seconds to two hours. In accordance with further embodiments, an averaging time of fifteen minutes for amplitude dynamics and thirty minutes for frequency dynamics may provide a good optimization between these competing requirements.

In further embodiments, data associated with non-physical irregularities is eliminated. In an illustrative embodiment, non-physical data irregularities may be caused by sensor failures, condensation in damping tubes, charge-amplifier failures, connection problems, electromagnetic interference (EMI), calibration drift, and/or other failures associated with a dynamics monitoring system. The present method may not assess anomalous behavior in devices associated with data eliminated due to sensor irregularities.

Device data that is obviously bad may be removed. For example, dynamics channels with large 50 or 60 Hz tones (EMI), very large low frequency content less than 10 Hz, or channels with near zero values may be removed.

Other irregular data may be more difficult to discern. An assessment may be made to determine whether irregular data is due, for example, to a sensor problem or a genuine device anomaly. The assessment may include examining the data of adjacent devices. For example, physical oscillations present in one gas turbine engine combustion chamber often manifest themselves, although to a lesser extent, in neighboring chambers. If chambers X+1 and X−1 exhibit some irregularities, but of sufficiently smaller magnitude than chamber X, this may indicate that the data represents a physical problem. In contrast, a sensor failure may result in combustion chamber X acting irregularly while adjacent chambers X−1 and X+1 behave normally.

In other embodiments, bad data may be identified by comparing a set of dynamics data for a particular device. Irregularities manifesting in multiple dynamics observables associated with a single device may indicate a sensor issue while an irregularity in one dynamic may indicate a genuine device related problem. Combustion chamber anomalies may manifest in specific observables, for instance, pilot nozzle issues may be confined to irregularities in Low Frequency Dynamics.

In certain embodiments, the elimination of bad data may be automated. In other embodiments, user intervention to assess irregularities may be advisable in view of the potentially catastrophic consequences of disregarding a real anomaly.

A time averaged reference mean, constituting "normal" operation, may be determined for comparison with current device data 206. A reference mean for each dynamics observable for each device may be calculated. Determining a reference mean may be challenging in view of the potentially large number of parametric dependencies of the device data. An illustrative approach is to identify a static representative time interval and define the reference data based upon historic values of the device data in that time interval. Static historic time intervals may be identified that most closely conform to the current operating conditions. With this approach, drift in the devices relative to each other, due to seasonal variations, part break-in/wearing, and the like may prove problematic. The reference mean may be updated after a time duration, to adjust for these items.

In other embodiments, the reference mean may be determined and regularly updated by defining a moving reference data window, rather than a static time interval. The moving reference window may comprise a sliding window that continuously looks back at historic device data, for example, 6 hours, 24 hours, 48 hours, one week, one month or some other time period earlier. An integer multiple of 24 hours as a shifting time window may work well for gas turbine engines that cycle on and off at the same time every day. However, data associated with gas turbine engines that do not operate on a periodic load profile may result in spurious alarms if the reference data was obtained at power, fuel or ambient conditions different than the instant engine operating conditions.

In a still further embodiment, the above-mentioned difficulties related to establishing a reference mean data set may be overcome by developing reference data criteria in order to direct a database query. The database may include, for example, historic dynamics observables data. The query may include reference data requirements and tolerances. Reference data requirements may comprise, for example and without limitation, power, machine-on time, transient operation, fuel composition and others. Tolerances for each data requirement may be defined. The query may be generated to find previous points of time, some time period back (e.g., 24, 48 hours), that satisfy the query criteria. A tolerance on the time shift back may also be defined. When a suitable reference time point is identified that satisfies the query, the value of the dynamics observables, over a suitable averaging window, may be utilized as reference data.

The dynamics observables device data may be baselined to eliminate many of the dependencies 208 of the dynamics observables upon other non-indicative parameters, for example, engine power level, ambient temperature, fuel composition, inlet guide vane angle, machine-on time and other gas turbine engine operating parameters.

The device-wise time averaged dynamics observables may be baselined with the reference mean dynamics data, for example, the time averaged reference mean data may be subtracted from the time averaged device data.

In accordance with an embodiment, the non-uniformity of a device relative to the others may be measured so that device behavior may be compared across devices rather than, or in addition to, across time. For example, the non-uniformity of combustion chamber (c) relative to other combustion chambers at time (T) may be calculated as the baselined device-wise dynamics observables at time (T) less the device-wise average of the baselined device-wise dynamics observables excluding the data associated with combustion chamber (c) at time (T).

Figure 2B:
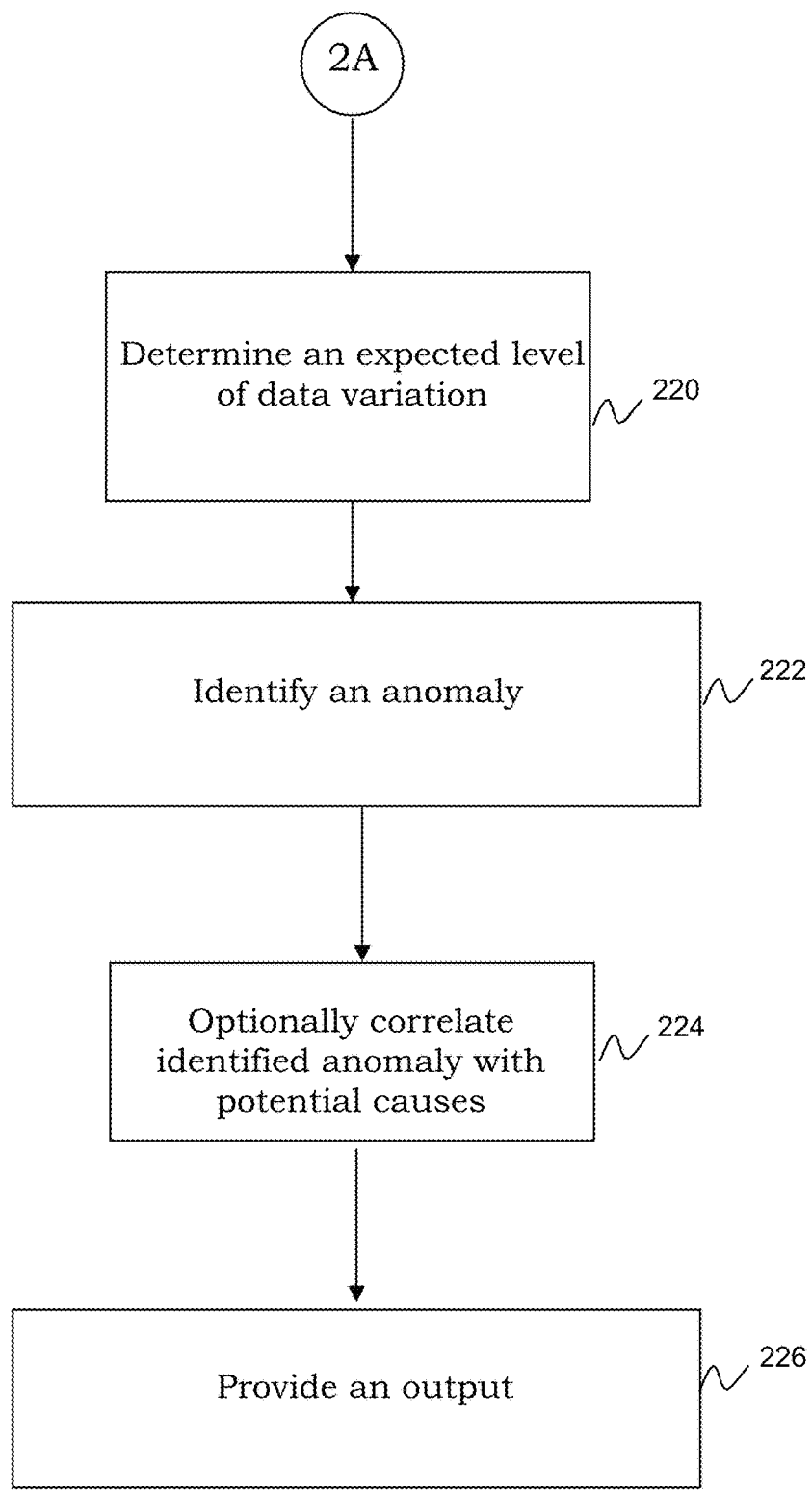
FIG. 2B is a flow diagram in accordance with an illustrative embodiment of the disclosed system and method.

Turning now to FIG. 2B, an expected level of data variation may be determined to assess the extent of device data deviations 220. In accordance with an embodiment of the present method, when a gas turbine engine is operating normally, the parameters that influence the dynamics observables are accounted for and there is no noise in the data. Thus, the value of the dynamics observable data with the reference value subtracted may approach zero. However, in reality it may not be zero because of inherent noise, complex dependencies of the dynamics observables upon uncontrolled variables and failures. Thus, an expected level of data variation may be calculated in order to determine how large data fluctuations are, relative to "normal". The expected level of data variation may be calculated across devices rather than, or in addition to, across time.

The expected level of data variation may be determined by calculating the standard deviation of the device data. However, this may provide a higher weighting to outlying data, allowing one anomalous device to skew the estimate, thereby reducing the sensitivity of the present anomaly detection method. The sum of absolute values may weight the data sets more uniformly. This quantity may be averaged over a time window. The time averaging window may be larger than the time window utilized to average the collected data, for example, greater than fifteen minutes for amplitude dynamics and greater than thirty minutes for frequency dynamics. Averaging the standard deviation of the device data over a time window may prevent the anomaly indicator from oscillating significantly.

An anomaly may be identified 222 by comparing the deviation of the device data of each device from the baseline data normalized by the expected level of variation. In accordance with certain embodiments, an anomaly in a gas turbine combustion chamber may be identified by comparing the deviation of sensor and device related data for each combustion chamber from the baseline data normalized by an expected level of variation.

An anomaly may be represented by a quantitative health indicator or non-uniformity parameter. In an embodiment, a health indicator value may be generated for the amplitude and frequency of each spectral bin. For example, implementations in certain gas turbine engines generate four spectral bins: Low Frequency Dynamics (LFD), Intermediate Frequency Dynamics, 1 (IFD1), Intermediate Frequency Dynamics, 2 (IFD2), and High Frequency Data (HFD). A health indicator value, or non-uniformity parameter, may be determined for the amplitude and frequency of each of the four spectral bin yielding eight non-uniformity parameters associated with, for example, each combustion chamber.

An anomaly, or a health indicator, may optionally be correlated with a potential cause 224. In an embodiment, a health indicator, or non-uniformity parameter, may be used as a quantitative indicator, or as a threshold output such as high/low or high/medium/low. A large value of the indicator for a particular device may be used to make an assessment of device health, or may be considered in conjunction with other operational data. In an embodiment, other gas turbine engine operational data may include, for example, exit blade path spreads, or air-fuel premixer temperatures.

In an illustrative embodiment, a blockage in the swirler of a combustion chamber premixing nozzle may manifest itself as a deviation in the amplitudes of the dominant frequencies due to the distortion of the airflow. The blockage may also be evident in excessive temperature in the nozzle caused by flame flashback. As a further illustrative example, a cracked hot gas transition piece may be apparent in shifts in amplitude and frequency in various ranges, as well as a change in blade path spreads.

Indicators may be used to point out potential problem areas by coupling them with failure matrices 224. For example, Table 1 was generated from information compiled by a group of series 501F gas turbine engine users. The chart lists various problems that may be encountered and how they may be manifested in dynamics data. For example, a large indicator value for the dynamics observable "Low Frequency Dynamics" amplitude may imply a pilot nozzle problem or blocked swirler. A large indicator value for the "Intermediate Frequency Dynamic 1" amplitude or frequency may point to a problem in a hot gas transition piece.

TABLE 1

| Frequency Range | Potential Indication |
|---|---|
| LFD | Flashback indicator, damaged swirlers, blocked airflow, pilot nozzle |
| IFD1 | Transition piece, transition seals, interface wearing/fretting, bypass valve distress |
| IFD2 | Transition piece, interface wearing/fretting |
| HFD | Combustion can distress |

Once an anomaly has been identified, the method 200 may generate an output 226, for example, a correlation of the detected anomaly with a potential cause.

In other embodiments, the method may not correlate an identified anomaly with potential causes. An anomaly may be identified and an output, for example, an alarm or notification may be generated and output by the system automatically. The output may comprise a quantitative indicator, or a threshold output such as high/medium/low. Examples of such output include spreadsheets, charts, plots, graphs, or any other representation to identify information of interest. For instance, the output may be presented on a user's display using images, colors, fonts, etc.

In accordance with further embodiments, the alarm or notification may take the form of, for example and without limitation, an audible alarm, email, voice mail, text message, instant message, social media message (e.g. tweet, Facebook message post), pager notification, or any other means to relate the information of interest.

FIG. 3A is a schematic diagram of a computer system depicting various computing devices that can be used alone or in a networked configuration in accordance with aspects of the present disclosure. For example, this figure illustrates a computer network 300 that has a plurality of computers 302, 304 and 206. The computer processing systems may be interconnected via a local or direct connection 308 or may be coupled via a communications network 310 such as a LAN, WAN, the world-wide web, etc. and which may be wired or wireless.

Each computer processing system may include, for example, one or more computing devices having user inputs such as a keyboard 312 and mouse 314 and/or various other types of input devices such as pen-inputs, joysticks, buttons, touch screens, microphone etc., as well as a display 316, which could include, for instance, a CRT, LCD, TV, projector, or other device used as a screen monitor.

Figure 3B:
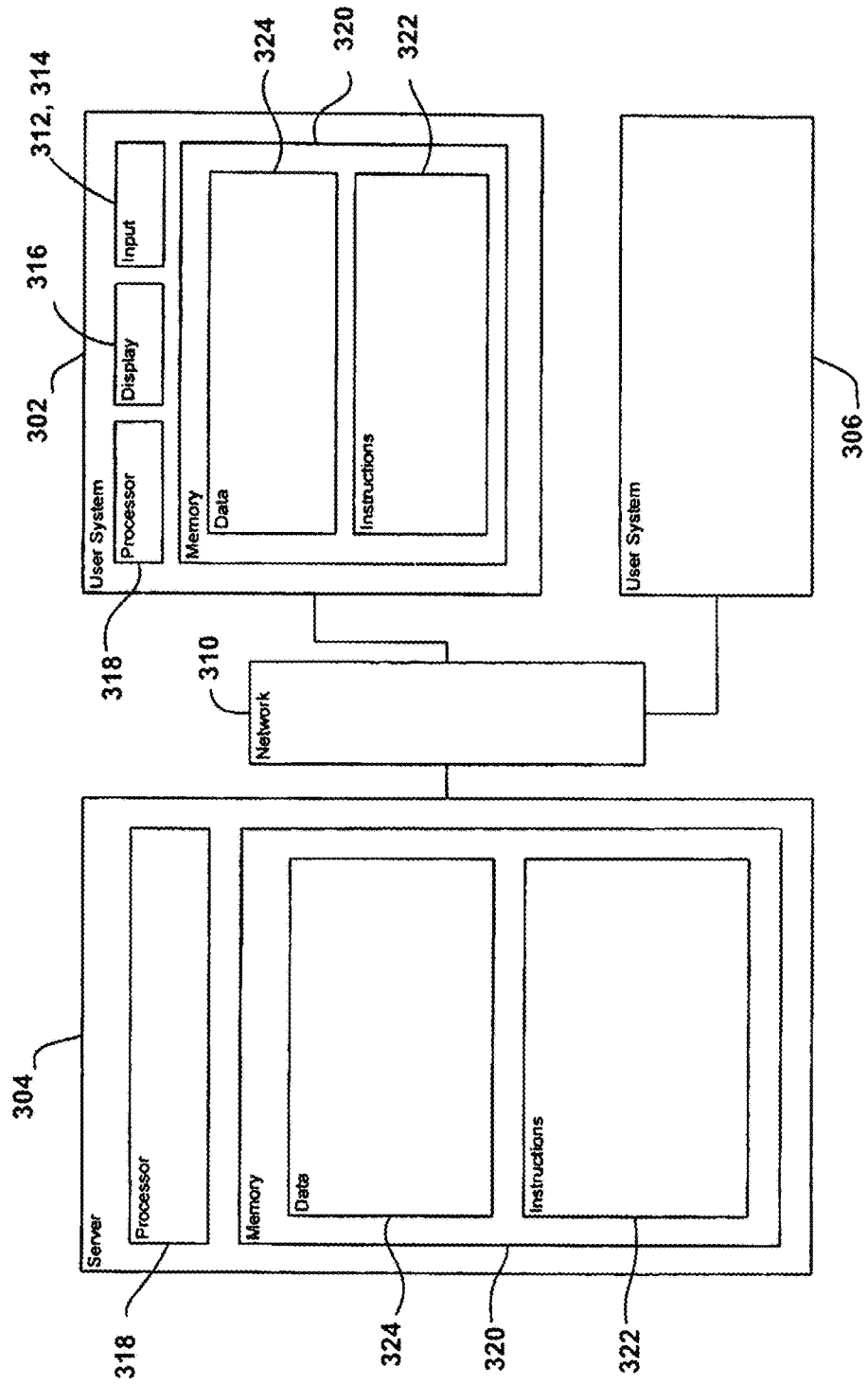
FIG. 3B is a schematic depiction of an illustrative computer network in accordance with embodiments of the disclosed system and method.

Each computer 302, 304 or 306 may be a personal computer, server, etc. By way of example only, computers 302 and 306 may be personal computers, smart phones, laptops, netbooks, or tablet computers, while computer 304 may be a server. For example, and as shown in FIG. 3B in particular, network 300 may include server 304 containing a processor 318, memory 320 and other components typically present in a computer.

Memory 320 stores information accessible by processor 318, including instructions 322 that may be executed by the processor 318 and data 324 that may be retrieved, manipulated or stored by the processor. The memory may be of any type capable of storing information accessible by the processor, such as a hard-drive, ROM, RAM, CD-ROM, write-capable or read-only memories.

The processor 318 may comprise any number of well known processors, such as processors from Intel Corporation or Advanced Micro Devices. Alternatively, the processor may be a dedicated controller for executing operations, such as an ASIC.

The instructions 322 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code.

Data 324 may be retrieved, stored or modified by processor 318 in accordance with the instructions 322. The data may be stored as a collection of data. For instance, although the disclosure is not limited by any particular data structure, the data may be stored in computer registers, in a relational database as a table having a plurality of different fields and records, XML documents, electronic spreadsheets or flat files. The data may also be formatted in any computer readable format. The data may include any information sufficient to identify the relevant information, such as descriptive text, proprietary codes, pointers, references to data stored in other memories (including other network locations) or information which is used by a function to calculate the relevant data.

Although the processor 318 and memory 320 are functionally illustrated in FIG. 3B as being within the same block, it will be understood that the processor and memory may actually comprise multiple processors and memories that may or may not be stored within the same physical housing or location. For example, some or all of the instructions and data may be stored on a removable CD-ROM, USB device or others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 320 such as hard drives or the like.

In one aspect, server 304 communicates with one or more client computers 302 and 306. The server 304 may be configured similarly to the client computers 302 and 306. Each client computer, with a processor, memory and instructions, as well as one or more user input devices 312, 314 and a user output device, such as display 316. Each client computer may be a general purpose computer, intended for use by a person, having all the components normally found in a personal computer such as a central processing unit ("CPU") 326, display 316, CD-ROM, hard-drive, mouse 314, keyboard 312, touch-sensitive screen, speakers, microphone, modem and/or router (telephone, cable or otherwise) and all of the components used for connecting these elements to one another.

The server 304 and client computers 302, 306 are capable of direct and indirect communication with other computers, such as over network 310. Although only a few computers are depicted in FIGS. 3A and 3B, it should be appreciated that a typical system can include a large number of connected servers and clients, with each different computer being at a different node of the network. The network 310, and intervening nodes, may comprise various configurations and protocols including the world-wide web, intranets, virtual private networks, wide area networks, local networks, private networks using communication protocols proprietary to one or more companies, Ethernet, WiFi or HTTP.

Communication across the network, including any intervening nodes, may be facilitated by any device capable of transmitting data to and from other computers, such as modems (e.g., dial-up or cable), network interfaces and wireless interfaces. Server 304 may be a web server. Although certain advantages are obtained when information is transmitted or received as noted above, other aspects of the disclosure are not limited to any particular manner of transmission of information. For example, in some aspects, the information may be sent via a medium such as a USB drive, disk, tape, CD-ROM, or directly between two computer systems via a dial-up modem. In other aspects, the information may be transmitted in a non-electronic format and manually entered into the system.

Moreover, computers in accordance with the methods described herein may comprise any device capable of processing instructions and transmitting data to and from humans and other computers, including network computers lacking local storage capability, PDAs with modems, Internet-capable wireless phones, smart phones, tablet PCs and the like.

The following examples are set forth merely to further illustrate the system and method for anomaly detection. The illustrative examples should not be construed as limiting the anomaly detection method in any manner.

The anomaly detection method has been tested using actual dynamics observables data and operational data associated with gas turbine engines that experienced component failures. Dynamics data was recorded for each engine previous to and during the time the failure events occurred. The dynamics data was provided to a system and method in accordance with the present disclosure. FIGS. 5A-5I and FIGS. 6A and 6B are graphical representations of the output of an embodiment of the present system and method.

Figure 5A:
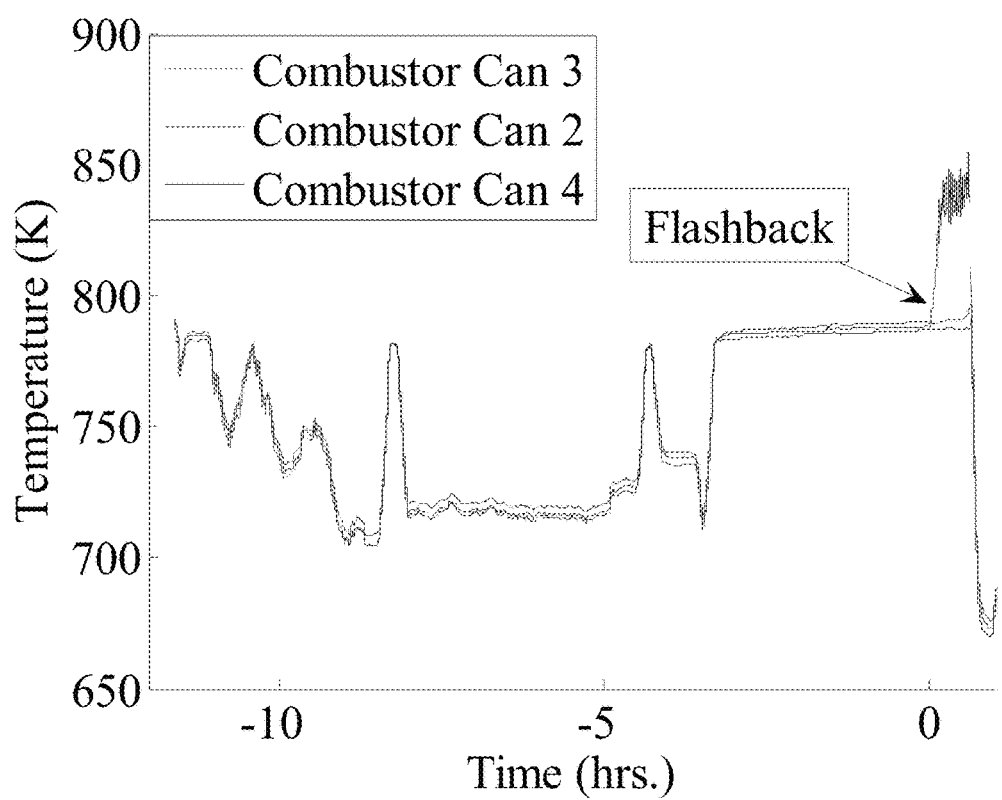
FIG. 5A is a graphical representation of a time history of gas turbine combustion chamber temperature measurements.

The first gas turbine engine experienced a cracked hot gas transition piece. The engine was shut down due to a high temperature reading in a fuel nozzle, indicative of a flashback event. The crack in the transition piece likely caused a diversion of air from the head end of the combustor through the transition piece. The diversion caused the fuel/air mixture in the combustor to shift to richer values resulting in the flashback of the flame and the temperature spike. FIG. 5A is a graphical representation of a time history of the temperatures recorded by thermocouples in three different combustor cans associated with the same gas turbine engine. Time t=0 hours marks the occurrence of the flashback. Note that a spike in temperature is registered by the thermocouple associated with combustor can 3. The temperature spike is the result of the crack in the transition piece and subsequent flashback event associated with combustor can 3.

Figure 5B:
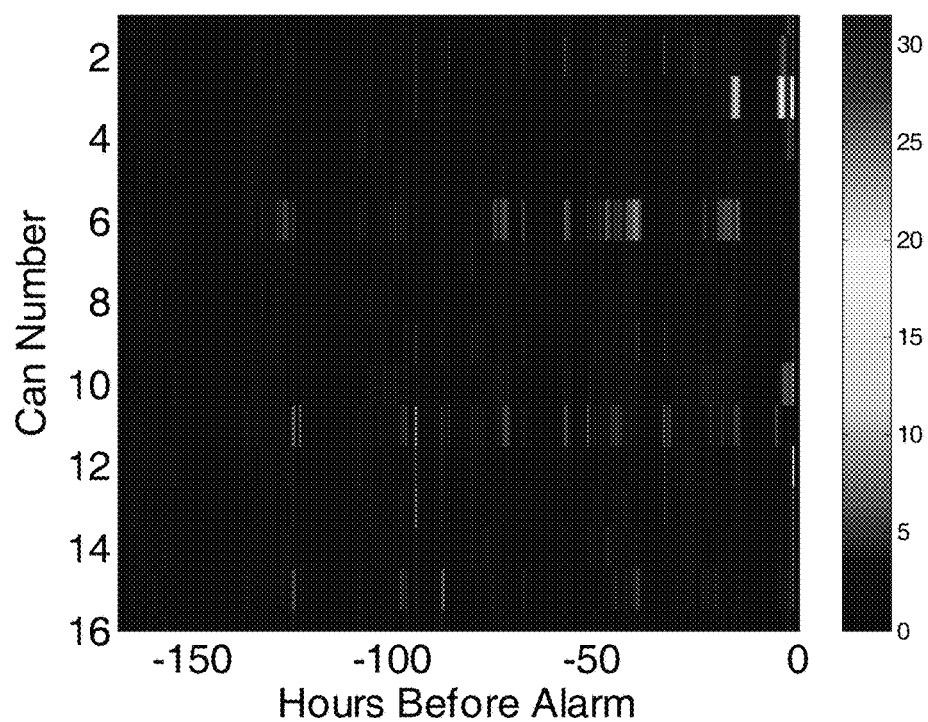
FIG. 5B is a graphical representation of illustrative output of the present system and method associated with the dynamics observable "Intermediate Frequency Dynamic, 1" amplitude, in accordance with an illustrative embodiment.
Figure 5C:
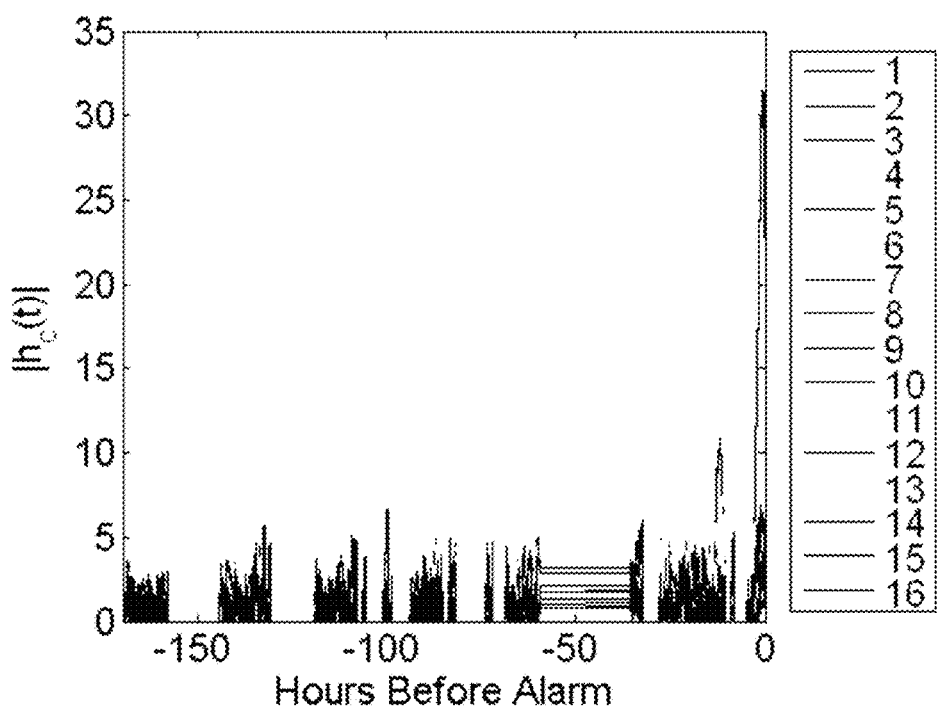
FIG. 5C is a graphical representation of illustrative output of the present system and method associated with the dynamics observable "Intermediate Frequency Dynamic, 1" amplitude, in accordance with an illustrative embodiment.

FIG. 5B is a plot representation of the anomaly detection method output, or health indicator $h_c$, for the first gas turbine engine over a 180 hour time period preceding the flashback event in combustor can 3. FIG. 5B and FIG. 5C plot the health indicator for the dynamics observable IFD1 amplitude associated with the engine's sixteen combustor cans including failed combustor can 3. It is clear that the value of the health indicator for can 3 increased in the time period preceding the flashback event. The anomaly detection method plainly identified the anomaly in the IFD1 amplitude observable and indicated precursors to the eventual failure.

Figure 5D:
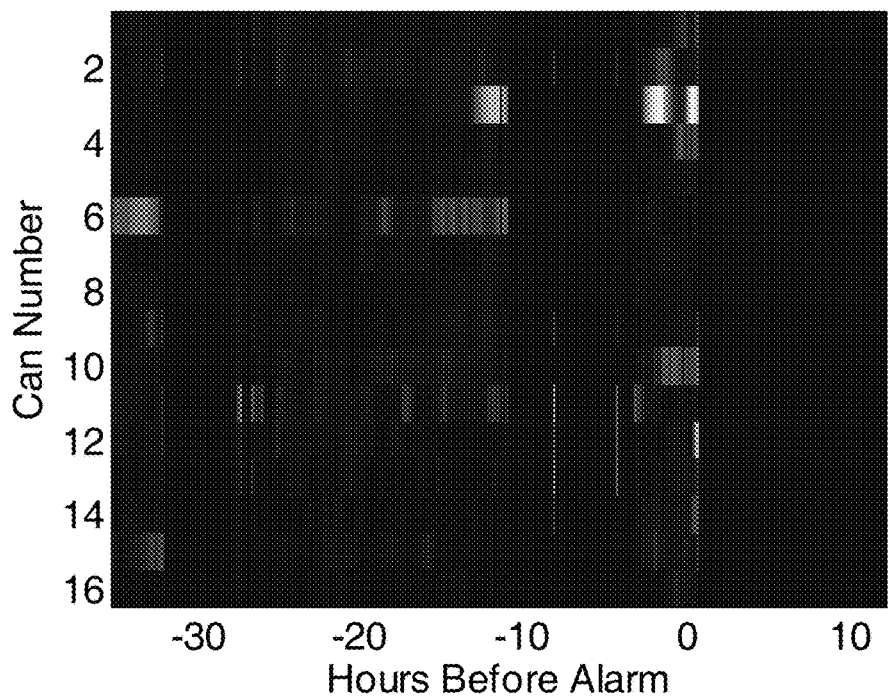
FIG. 5D is a graphical representation of illustrative output of the present system and method associated with the dynamics observable "Intermediate Frequency Dynamics, 1" amplitude, in accordance with an illustrative embodiment.
Figure 5E:
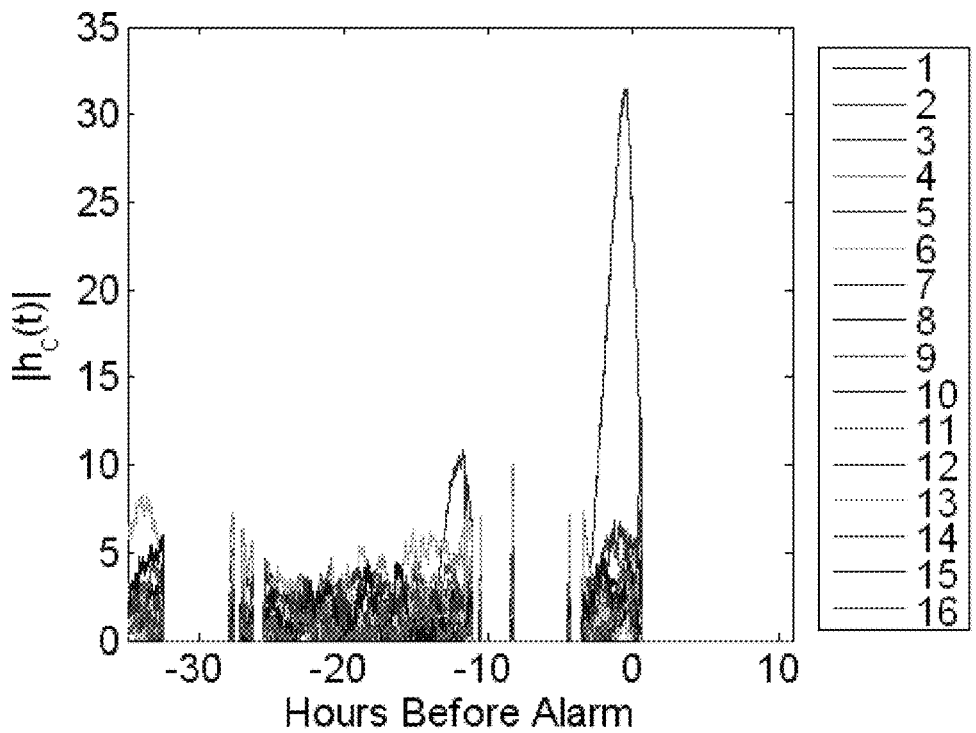
FIG. 5E is a graphical representation of illustrative output of the present system and method associated with the dynamics observable "Intermediate Frequency Dynamics, 1" amplitude, in accordance with an illustrative embodiment.

FIG. 5D and FIG. 5E present a zoomed-in view of FIG. 5B and FIG. 5C illustrating the anomaly detection method output during the 35 hours preceding the flashback event.

Figure 5F:
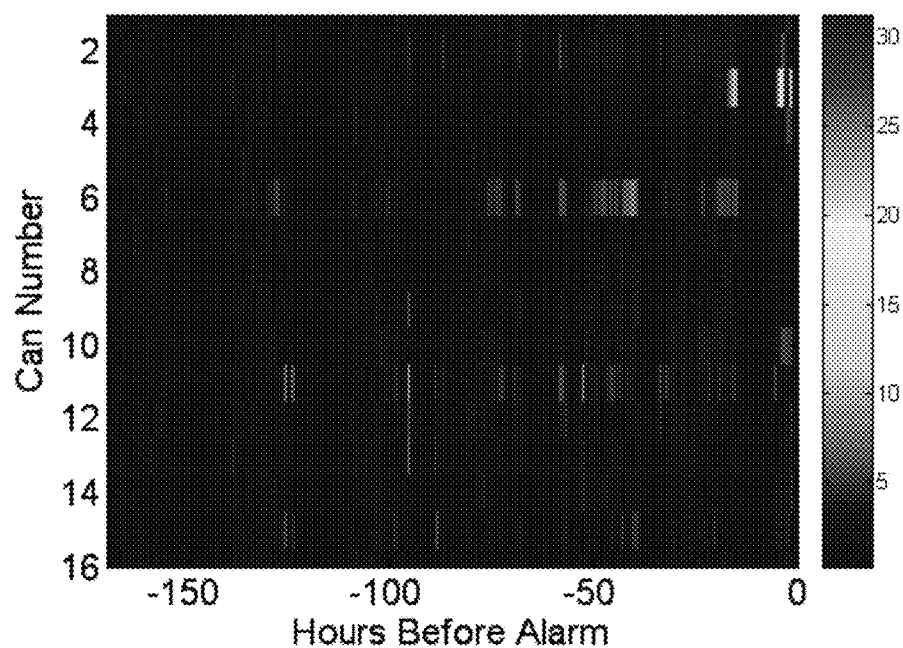
FIG. 5F is a graphical representation of illustrative output of the present system and method associated with the dynamics observable "Intermediate Frequency Dynamics, 2" amplitude, in accordance with an illustrative embodiment.
Figure 5G:
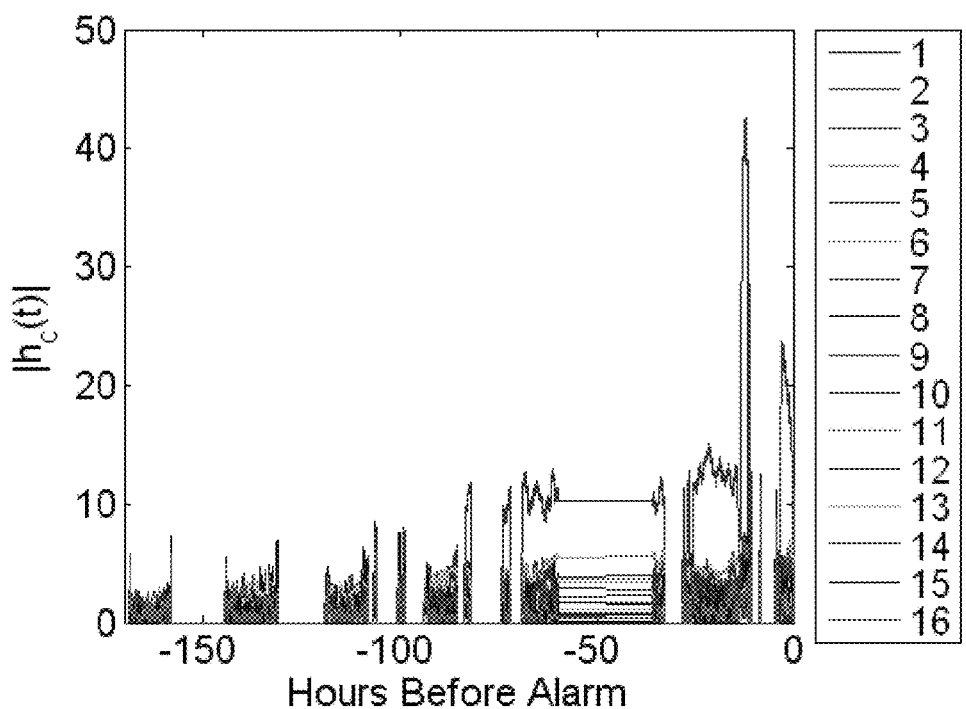
FIG. 5G is a graphical representation of illustrative output of the present system and method associated with the dynamics observable "Intermediate Frequency Dynamics, 2" amplitude, in accordance with an illustrative embodiment.
Figure 5H:
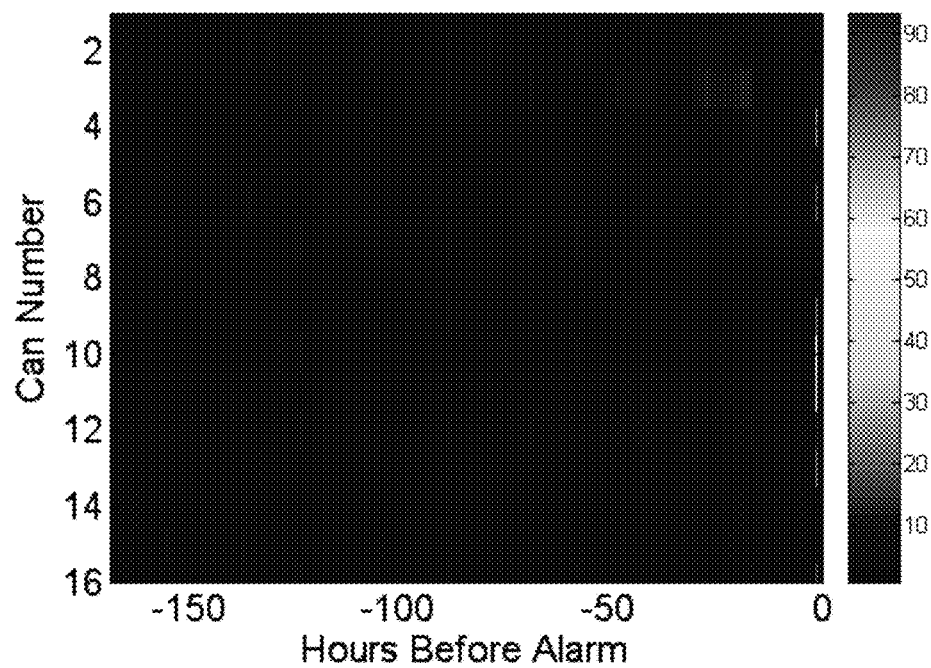
FIG. 5H is a graphical representation of illustrative output of the present system and method associated with the dynamics observable "Intermediate Frequency Dynamics, 2" frequency, in accordance with an illustrative embodiment.
Figure 5I:
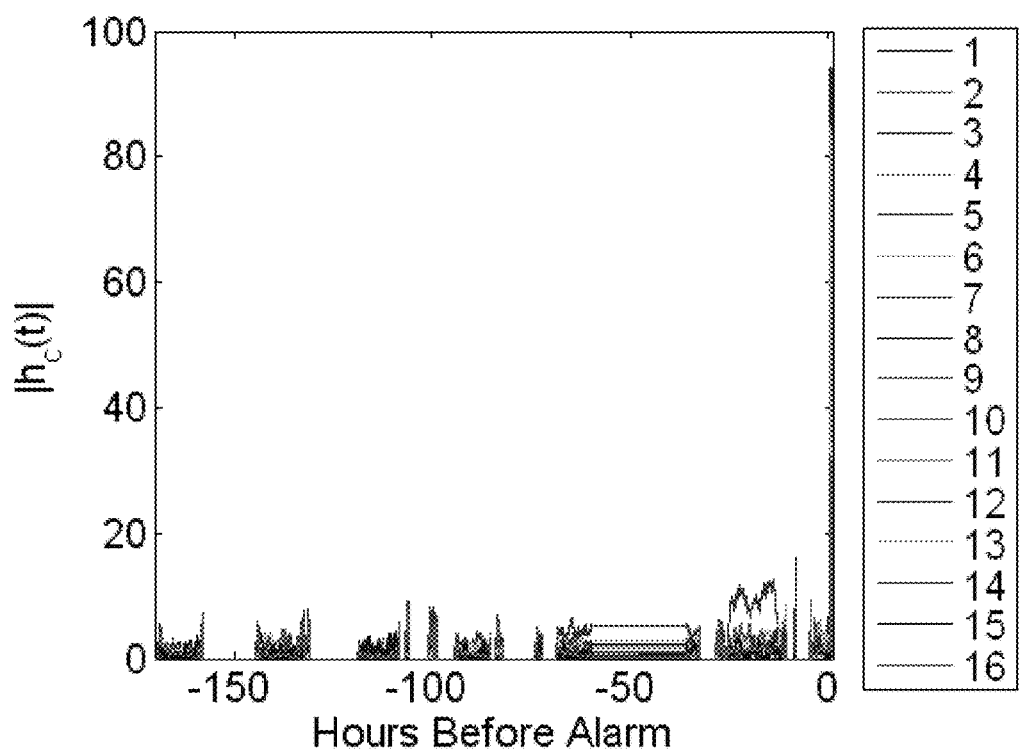
FIG. 5I is a graphical representation of illustrative output of the present system and method associated with the dynamics observable "Intermediate Frequency Dynamics, 2" frequency, in accordance with an illustrative embodiment.

FIG. 5F and FIG. 5G are graphical representations of the anomaly detection method output for the dynamics observable IFD2 amplitude over the 180 hour time period. FIG. 5H and FIG. 5I are graphical representations of the anomaly detection method output for the dynamics observable IFD2 frequency over the same time period. The method clearly identified the anomaly in both of these observables more than twenty-four hours before the occurrence of the flashback event.

These results plainly demonstrate that the present anomaly detection method would have predicted the impending failure of the hot gas transition piece at least one day before the forced outage caused by the failure.

Figure 6A:
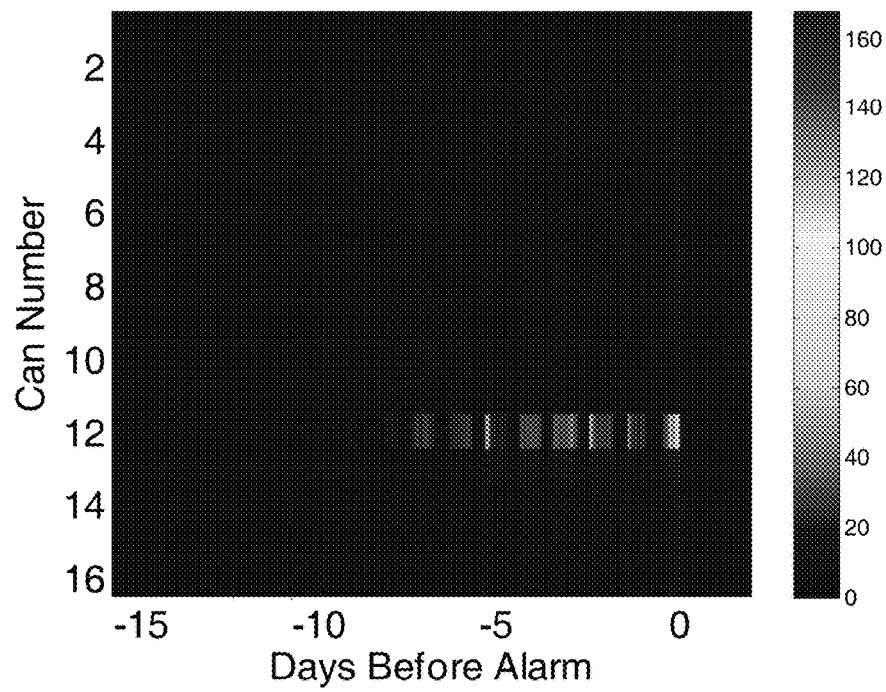
FIG. 6A is a graphical representation of illustrative output of the present system and method associated with the dynamics observable "Low Frequency Dynamics" amplitude, in accordance with an illustrative embodiment.
Figure 6B:
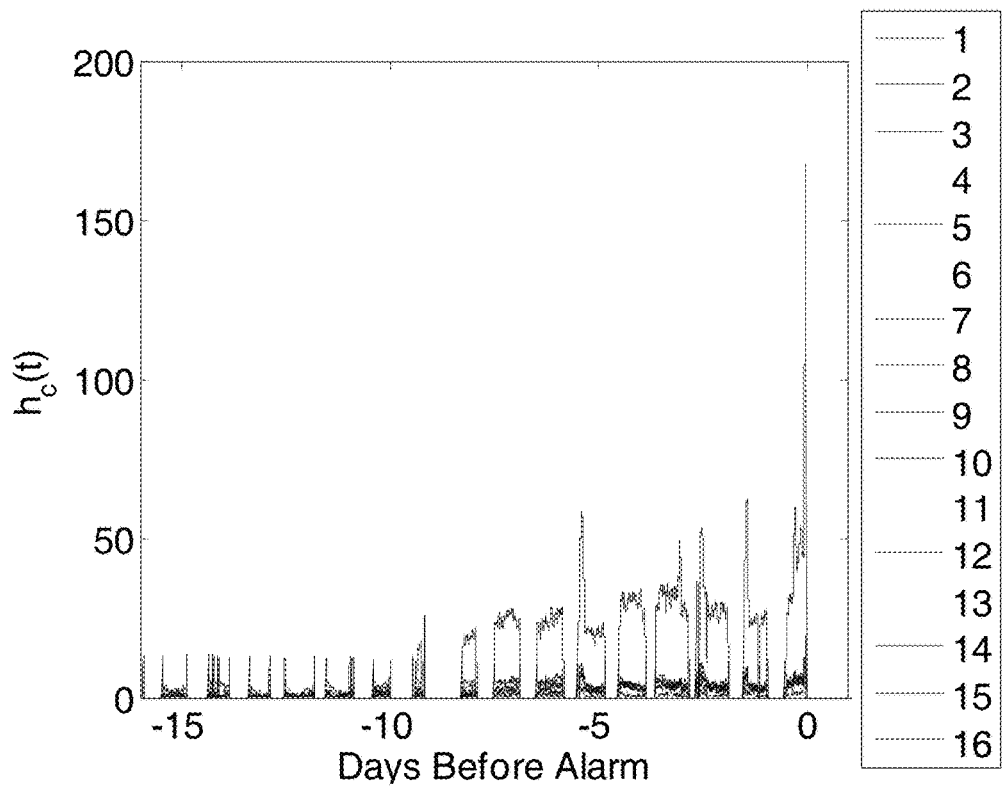
FIG. 6B is a graphical representation of illustrative output of the present system and method associated with the dynamics observable "Low Frequency Dynamics" amplitude, in accordance with an illustrative embodiment.

The second gas turbine engine experienced a pilot nozzle failure. FIG. 6A and FIG. 6B are graphical representations of the anomaly detection method output for the dynamics observable LFD amplitude. FIG. 6A is a plot of the health indicator value from sixteen days of LFD amplitude data for each of the gas turbine engine's sixteen cans. The health indicator associated with can 12 begins to increase five to ten days prior to the pilot nozzle failure. These results demonstrate that the present anomaly detection method would have predicted the impending pilot nozzle failure more than five days preceding the failure event.

A first embodiment provides a computer implemented method for anomaly detection comprising utilizing one or more processors and associated memory storing one or more programs for execution by the one or more processors, the one or more programs including instructions for (a) receiving operational and dynamics data from a plurality of sensors associated with a plurality of devices, (b) filtering the data, (c) establishing a set of baseline dynamics data including calculating a reference mean for each dynamic based on identifying historical data values (i) relating to a sliding time window or (ii) corresponding to a database query, said query comprising establishing reference data requirements and tolerances, identifying previous points in time that satisfy said requirements and tolerances and averaging the value of dynamics data related to said identified points in time, (d) eliminating data dependencies, (e) generating an expected level of data variation, (f) identifying an anomaly based on a deviation of the device data from the baseline data normalized by the expected level of data variation, (g) optionally correlating the anomaly with potential causes, and (h) providing an output.

The method of the first embodiment may further include that the devices comprise gas turbine combustor cans.

The method of any of the first or subsequent embodiments may further include that the dynamics data comprise pressure oscillations.

The method of any of the first or subsequent embodiments may further include that the dynamics data further comprise at least one of electromagnetic radiation, chemiluminescence, velocity oscillations or another observable related to combustion dynamic data.

The method of any of the first or subsequent embodiments may further include that filtering data comprises data smoothing and eliminating outlying data.

The method of any of the first or subsequent embodiments may further include that the filtering data comprises data smoothing. The data smoothing may further comprise Fourier transforming the dynamics data, extracting an amplitude and frequency for a plurality of pressure oscillation spectral bins over a time period and calculating a backward running average.

The method of any of the first or subsequent embodiments may further include that the time period comprises fifteen to thirty minutes.

The method of any of the first or subsequent embodiments may further include that the spectral bins comprise at least one of low frequency dynamics, first intermediate dynamics, second intermediate dynamics or high frequency dynamics.

The method of any of the first or subsequent embodiments may further include that the eliminating outlying data comprises eliminating bad sensor data, and/or eliminating data excursions present in data related to a gas turbine combustor can but not present in data relating to adjacent gas turbine combustor cans.

The method of any of the first or subsequent embodiments may further include that the sliding time window looks back at predefined time periods and the baseline data is updated at each pre-defined time period.

The method of any of the first or subsequent embodiments may further include that the data requirements comprise power, machine-on time, fuel composition, transient operation, ambient temperature, inlet guide vane angle, temperature, fuel splits, flashback temperature, and the like.

The method of any of the first or subsequent embodiments may further include that the eliminating data dependencies comprises subtracting the reference mean from the dynamics data for each device, calculating the non-uniformity of each device relative to other devices, and analyzing changes in one device relative to changes in the other devices.

The method of any of the first or subsequent embodiments may further include that the expected level of data variation comprises quantifying a level of data variation across devices.

In a second embodiment, an anomaly detection system for detecting anomalies in a turbine engine comprises (a) an input data module configured to receive sensor data from the turbine engine, (b) a processing module adapted to (i) establish a set of baseline dynamics data including calculating a reference mean for each dynamic based on identifying historical data values 1) relating to a sliding time window, or 2) corresponding to a database query capable of establishing reference data requirements and tolerances, identifying previous points in time that satisfy said requirements and tolerances and averaging the value of dynamics data related to said identified points in time, (ii) eliminate data dependencies, (iii) generate an expected level of data variation; and (iv) identify an anomaly based on a deviation of the sensor data from the baseline data normalized by the expected level of data variation, (c) a database capable of storing sensor data and communicating with the processing module, (d) an output data module capable of reporting results identified by the processing module, (e) an interface module capable of communicating results reported by the output data module, (f) a processor capable of managing operation of the data input module, processing module, database, output data module and/or interface module and (g) memory capable of storing instructions and data for execution by the system.

The system of the second embodiment may further include that the sliding time window looks back at predefined time periods.

The system of any of the second or subsequent embodiments may further include that the processing module is adapted to subtract the reference mean from the dynamics data for each device, calculate the non-uniformity of each device relative to other devices, and analyze changes in one device relative to changes in the other devices.

A third embodiment provides a computer-readable storage medium on which is encoded executable program code for performing a method which comprises: (a) receiving operational and dynamics data from a plurality of sensors associated with a plurality of devices, (b) filtering the data, (c) establishing a set of baseline dynamics data including calculating a reference mean for each dynamic based on identifying historical data values (i) relating to a sliding time window or (ii) corresponding to a database query capable of establishing reference data requirements and tolerances, identifying previous points in time that satisfy said requirements and tolerances and averaging the value of dynamics data related to said identified points in time, (d) eliminating data dependencies, (e) generating an expected level of data variation, (f) identifying an anomaly based on a deviation of the device data from the baseline data normalized by the expected level of data variation, (g) optionally correlating the anomaly with potential causes, and (h) providing an output indicating an anomaly.

The third embodiment may further include that the devices comprise gas turbine combustor cans and the dynamics data comprise pressure oscillations.

The third or subsequent embodiments may further include that the eliminating data dependencies comprises subtracting the reference mean from the dynamics data for each device, calculating the non-uniformity of each device relative to other devices, and analyzing changes in one device relative to changes in the other devices.

The embodiments described above are not necessarily in the alternative, as various embodiments may be combined to provide the desired results.

The invention claimed is:

1. A computer implemented method for anomaly detection, the method comprising:
    utilizing one or more processors and associated memory storing one or more programs for execution by the one or more processors, the one or more programs including instructions for:
    receiving operational and dynamics data from a plurality of sensors associated with a plurality of devices;
    filtering the data, wherein said filtering the data comprises data smoothing and eliminating outlying data, the data smoothing comprising:
        Fourier transforming the dynamics data;
        extracting an amplitude and frequency for a plurality of pressure oscillation spectral bins over a time period; and
        calculating a backward running average;
    establishing a set of baseline dynamics data including calculating a reference mean for each dynamic based on identifying historical data values
        a. relating to a sliding time window, or
        b. corresponding to a database query establishing reference data requirements and tolerances; identifying previous points in time that satisfy said data requirements and tolerances; and averaging the value of dynamics data related to said identified points in time;
    eliminating data dependencies;
    generating an expected level of data variation;
    identifying an anomaly based on a deviation of the device data from the baseline data normalized by the expected level of data variation;
    optionally correlating the anomaly with potential causes; and
    providing an output indicating the anomaly.

2. The method of claim 1, wherein the devices comprise gas turbine combustor cans.

3. The method of claim 2, wherein the dynamics data comprise pressure oscillations.

4. The method of claim 2, wherein the dynamics data further comprise at least one of electromagnetic radiation, chemiluminescence, velocity oscillations or another observable related to combustion dynamic data.

5. The method of claim 1, wherein the time period comprises ten seconds to two hours.

6. The method of claim 1, wherein the spectral bins comprise a plurality of dynamics, optionally at least one of low frequency dynamics, first intermediate dynamics, second intermediate dynamics or high frequency dynamics.

7. The method of claim 1, wherein said eliminating outlying data comprises:
    eliminating bad sensor data; and/or
    eliminating data excursions present in data related to a gas turbine combustor can but not present in data relating to adjacent gas turbine combustor cans.

8. The method of claim 1, wherein the sliding time window looks back at predefined time periods and the baseline data is updated at each pre-defined time period.

9. The method of claim 1, wherein said data requirements comprise at least one of power, machine-on time, fuel composition, transient operation, ambient temperature, inlet guide vane angle, exit temperature, fuel splits or flashback temperature.

10. The method of claim 1, wherein said eliminating data dependencies comprises:
    subtracting the reference mean from the dynamics data for each device;
    calculating the non-uniformity of each device relative to other devices; and
    analyzing changes in one device relative to changes in the other devices.

11. The method of claim 1, wherein said expected level of data variation comprises:
    quantifying a level of data variation across devices.

12. An anomaly detection system for detecting anomalies in a turbine engine, the anomaly detection system comprising:
    an input data module configured to receive sensor data from the turbine engine;
    a processing module adapted to
    i) filter the data, wherein said filtering the data comprises data smoothing and eliminating outlying data, the data smoothing comprising:
        Fourier transforming the dynamics data;
        extracting an amplitude and frequency for a plurality of pressure oscillation spectral bins over a time period; and
        calculating a backward running average;
    ii) establish a set of baseline dynamics data including calculating a reference mean for each dynamic based on identifying historical data values a) relating to a sliding time window, or b) corresponding to a database query capable of establishing reference data requirements and tolerances, identifying previous points in time that satisfy said data requirements and tolerances and averaging the value of dynamics data related to said identified points in time, iii) eliminate data dependencies, iv) generate an expected level of data variation; and v) identify an anomaly based on a deviation of the sensor data from the baseline data normalized by the expected level of data variation;

a database capable of storing sensor data and communicating with the processing module;

an output data module capable of reporting results identified by the processing module;

an interface module capable of communicating results reported by the output data module;

a processor capable of managing operation of the data input module, processing module, database, output data module and/or interface module; and memory capable of storing instructions and data for execution by the system.

13. The system of claim 12, wherein said sliding time window looks back at predefined time periods.

14. The system of claim 13, wherein the processing module is further adapted to:

subtract the reference mean from the dynamics data for each device;

calculate the non-uniformity of each device relative to other devices; and analyze changes in one device relative to changes in the other devices.

15. A non-transitory computer-readable storage medium on which is encoded executable program code for performing a method comprising:

receiving operational and dynamics data from a plurality of sensors associated with a plurality of devices;

filtering the data, wherein said filtering the data comprises data smoothing and eliminating outlying data, the data smoothing comprising:

Fourier transforming the dynamics data;

extracting an amplitude and frequency for a plurality of pressure oscillation spectral bins over a time period; and calculating a backward running average;

establishing a set of baseline dynamics data including calculating a reference mean for each dynamic based on identifying historical data values a. relating to a sliding time window, or b. corresponding to a database query establishing reference data requirements and tolerances; identifying previous points in time that satisfy said data requirements and tolerances; and averaging the value of dynamics data related to said identified points in time;

eliminating data dependencies;

generating an expected level of data variation;

identifying an anomaly based on a deviation of the device data from the baseline data normalized by the expected level of data variation;

optionally correlating said anomaly with potential causes; and providing an output indicating the anomaly.

16. The non-transitory computer-readable storage medium of claim 15, wherein said devices comprise gas turbine combustor cans and said dynamics data comprise pressure oscillations.

17. The non-transitory computer-readable storage medium of claim 16, wherein said eliminating data dependencies comprises:

subtracting the reference mean from the dynamics data for each device;

calculating the non-uniformity of each device relative to other devices; and analyzing changes in one device relative to changes in the other devices.

* * * * *